United States Patent [19]

van Dijk et al.

[11] Patent Number: 5,108,669
[45] Date of Patent: Apr. 28, 1992

[54] PROCESS AND APPARATUS PERFORATING TUBULAR PLASTIC FOIL WITH A LASER BEAM

[75] Inventors: Berend J. van Dijk, Slagharen; Roelof Koopman, Hardenberg, both of Netherlands

[73] Assignee: Wavin B.V., Netherlands

[21] Appl. No.: 573,014

[22] PCT Filed: Jun. 15, 1989

[86] PCT No.: PCT/NL89/00049
§ 371 Date: Nov. 29, 1990
§ 102(e) Date: Nov. 29, 1990

[87] PCT Pub. No.: WO89/12540
PCT Pub. Date: Dec. 28, 1989

[30] Foreign Application Priority Data
Jun. 17, 1988 [NL] Netherlands ............. 8801550

[51] Int. Cl.⁵ ............................. B23K 26/10
[52] U.S. Cl. .................... 264/25; 219/121.67;
219/121.72; 264/154; 425/142; 425/174.4;
425/290
[58] Field of Search .............. 264/22, 25, 154, 155,
264/156; 425/142, 174.4, 290; 219/121.67,
121.72

[56] References Cited

U.S. PATENT DOCUMENTS

| | | | |
|---|---|---|---|
| 3,931,491 | 1/1976 | Stumpf | 219/121.82 |
| 4,028,525 | 6/1977 | Mominee et al. | 264/25 |
| 4,254,916 | 3/1981 | Havens et al. | 239/547 |
| 4,511,520 | 4/1985 | Bowen | 264/154 |
| 4,672,168 | 6/1987 | Saunders et al. | 219/121.7 |

FOREIGN PATENT DOCUMENTS

| | | |
|---|---|---|
| 0155035 | 9/1985 | European Pat. Off. |
| 2230474 | 12/1974 | France |
| 7104456 | 10/1971 | Netherlands |

OTHER PUBLICATIONS

Patent Abstracts of Japan, vol. 10, No. 277, May 1986, 61-99594(A).

*Primary Examiner*—Jay H. Woo
*Assistant Examiner*—Robert B. Davis
*Attorney, Agent, or Firm*—Wigman & Cohen

[57] ABSTRACT

A continuously conveyed tubular plastic foil is perforated by a laser beam which is focused by a mirror or lens on the perforation forming plane, lying at the focal point of the mirror or lens, of a tautly conveyed tubular plastic foil. For taut conveyance of the tubular foil it is guided over a support placed in the tubular foil, or over supporting plates, lying outside the tubular foil and provided with a foil suction device and with laser beam transmission apertures. The slightly tapering perforations with a minimum aperture at the inside of the tubular foil form, on the one hand, a pattern of parallel lines running in the lengthwise direction and, on the other hand, a pattern of parallel lines which run at an angle relative to the longitudinal axis of the flattened tubular foil. A bag can be formed from the tubular foil. An apparatus for perforation is made up of, in addition to a laser beam source, a lens beam-directing device and a lens or mirror, a support to be placed in a tubular foil, or supporting plates, provided with apertures and with foil suction apertures, for taut conveyance of the tubular foil in a perforation forming plane.

9 Claims, 2 Drawing Sheets

PROCESS AND APPARATUS PERFORATING TUBULAR PLASTIC FOIL WITH A LASER BEAM

FIELD OF THE INVENTION

The invention relates to a process and an installation of manufacturing a perforated tubular plastic foil through the action of a laser beam.

DESCRIPTION OF PRIOR ART

Such a process for perforating a plastic foil using a laser beam is known. Plastic foils perforated with a laser beam in fact constitute a very suitable material for the production of bags for packing loose material in suitable quantities of, for example, 25 kg. Since in the filling of the bags with loose powder-type material this loose material is conveyed with air, after the bag has been filled a quantity of air is left behind between the particles of the powder material, and this air must be able to excape while leaving the powder material behind in the bag. Moreover, after filling, these perforations permitting a rapid deaeration must also be sealed quickly and as well as possible, in order to prevent loss of material and the penetration of moisture into the bag.

However, when a plastic tubular foil lying in a flat position is being perforated, it is difficult to obtain perforations of the desired size. If the plastic foil material to be perforated is too thick, a conical perforation being large at the entry side of the laser beam and small at the opposite side is produced. This means that in a tubular foil which is lying flat a relatively large or even too large a perforation is produced in the top layer of the foil, and a relatively small or too small a perforation in the layer of the foil underneath it, which is integral with the top layer of the foil on which the laser beam acts directly and first.

Another disadvantage is that when the tubular foil is lying flat the two layers of plastic lying closely on top of each other are together of such great thickness that the laser beam is difficult to focus over the entire thickness of the two layers of foil, which means that during the perforation with the laser beam melting of the perforation edges occurs.

In the case of perforating the plastic tubular foil with a layer of air between the two layers of plastic of the tubular foil the problem is that the laser beam is then not focused sharply enough, while the amount of energy for formation of the perforations becomes unacceptably high, and consequently too large perforations are formed and are, moreover, formed in imprecisely defined places.

In order to avoid these shortcomings U.S. Pat. No. 4,254,916 discloses a process of manufacturing a perforated tubular foil by means of a laser beam wherein the wall part of the foil to be perforated is guided in a perforation forming plane by sucking said wall part onto a supporting surface located outside the tubular foil, the remaining wall part of the tubular foil being held free from the wall part to be perforated.

However, this process presents the disadvantage that often the foil surface to be perforated is not tautly sucked onto the tubular foil supporting means situated outside the tubular foil. This involves the formation of creases in the foil surface leading to perforations at the incorrect position and/or with incorrect dimensions.

SUMMARY OF THE INVENTION

The object of the invention is now to provide a process of manufacturing a perforated tubular plastic foil through the action of a laser beam on the tubular wall of a tubular foil thereby forming perforations ranging from 50 to 250 $\mu$m in size, and in which perforations of the desired size are obtained in the correct plane and with the correct dimensions, without melting of the perforation edges and without inadmissibly high energy consumption.

Thus, the invention relates to a process of manufacturing a perforated tubular plastic foil through the action of a laser beam on the tubular foil wall, forming perforations ranging from 50 to 250 $\mu$m in size, wherein during the perforation action the wall part to be perforated and lying free from the remaining wall of the tubular foil is guided in a perforation forming plane on which the laser beam is founded, as known from U.S. Pat. No. 4,254,916, being characterized in that the wall part to be perforated is conveyed tautly over a support placed in the interior of the tubular foil.

By guiding the wall part of the tubular foil to be perforated tautly in a perforation forming plane according to the process of the invention, the laser beam can now be focused accurately, and an accurately defined perforation can therefore be obtained.

It is particularly advantageous for the laser beam to be focused using at least one lens and/or mirror on the perforation forming plane which lies at the focus of the lens and/or mirror.

In this way perforation apertures which meet the required standards in the optimum way are obtained with the optimum use of energy.

It is expedient if during the perforation action two opposite wall parts of the tubular foil are each perforated in a perforation working plane, so that the perforations can be distributed uniformly over the tubular foil surface.

In the process according to the invention the tubular foil is advantageously conveyed continuously, which means that a large number of perforations can be formed quickly.

An intermittent laser beam expediently moves at right angles to the direction of conveyance along the continuously moving tubular foil, thereby forming a pattern of perforations placed in parallel lines.

The invention also relates to a plastic bag formed from a perforated tubular plastic foil by using the process according to the invention.

In particular, the invention also comprises a perforated tubular plastic foil with perforation apertures ranging from 50 to 250 $\mu$m formed by laser beam, and provided with a pattern of parallel lines (A) of successive perforations formed by laser beam, while in the transverse direction the perforations form a pattern of parallel lines (B) running at an angle relative to the longitudinal axis of the tubular foil across the width of the flattened tubular foil, and a bag formed therefrom.

Finally, the invention relates to an installation for carrying out the process according to the invention, at least comprising a device for forming a laser beam, tubular plastic foil supporting means, and tubular plastic foil conveying means for conveying the tubular foil.

The installation according to the invention at plastic foil dicharge means, laser beam action interruption means, tubular plastic foil supporting means guiding a wall part of a tubular plastic foil to be perforated in a perforation forming plane, while the other part of the tubular plastic foil lies free from this perforation forming plane, and beam directing means and at least one lens for focusing the laser beam on the above-mentioned perforation forming plane as known from U.S. Pat. No. 4,254,916, which is characterized according to the invention in that the supporting means form a support to be placed inside a tubular foil, and over which the tubular foil can be guided tautly.

The installation according to the invention at least has lenses set up in such a way that the focal point of said lens lies in a perforation forming plane.

BRIEF DESCRIPTION OF THE DRAWINGS

The invention will now be explained with reference to an example of an embodiment as shown in the drawing, in which:

FIG. 3 shows a plastic bag formed from a perforated tubular plastic foil obtained by the process according to the invention.

DETAILED DESCRIPTION OF THE INVENTION

Figure 1:
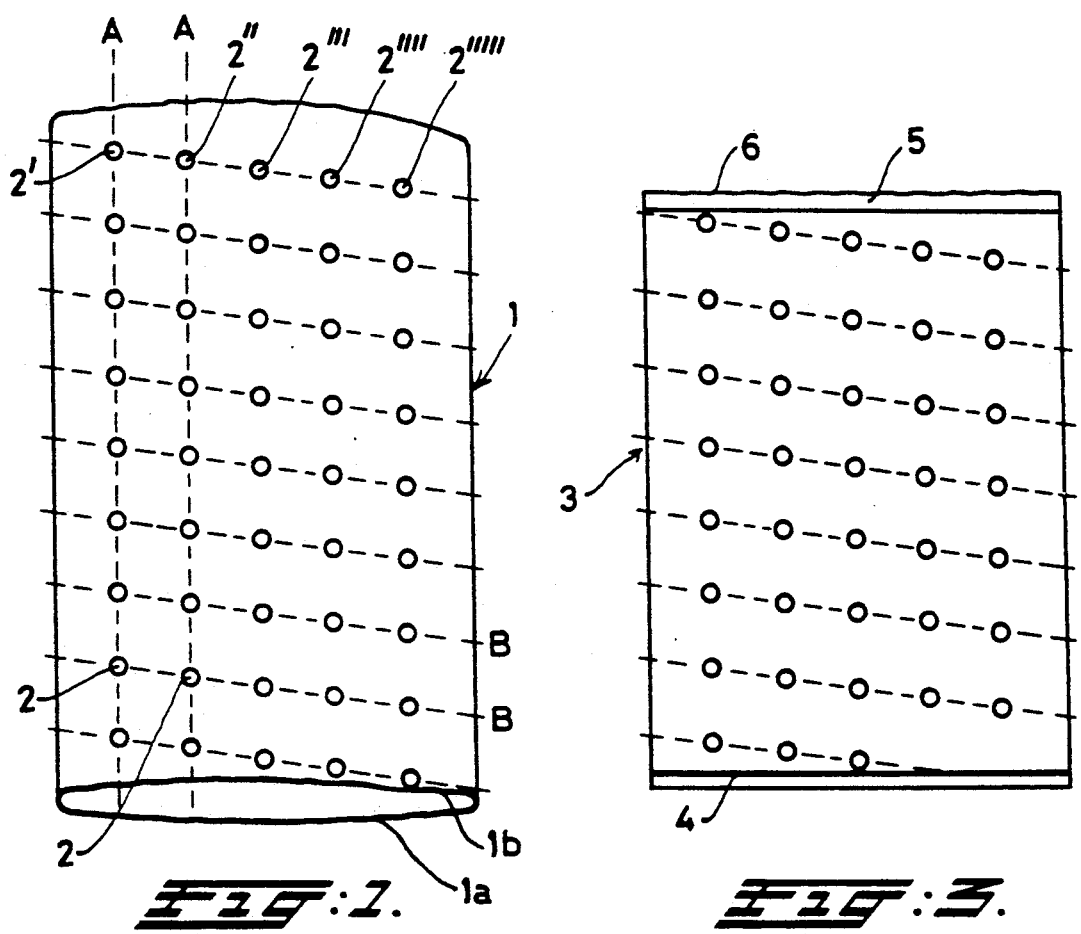
FIG. 1 shows a top view of a tubular plastic foil with perforations formed by using the process of the invention.

As can be seen in FIG. 1, a tubular foil 1 is provided with perforations 2 ranging from 50 to 250 $\mu m$ in size.

The perforations form a pattern of parallel lines (A) in the lengthwise direction of the tubular plastic foil 1, and in the transverse direction of the tubular plastic foil the perforations 2 form lines (B) which run at an angle relative to the longitudinal axis of the foil. These lines A and B are shown as dashed lines.

FIG. 3 shows a plastic bag 3 made from a tubular plastic foil perforated by the process according to the invention, with a transverse seal forming a bottom 3, and a filling aperture 5 bounded by a peripheral edge 6.

Figure 2:
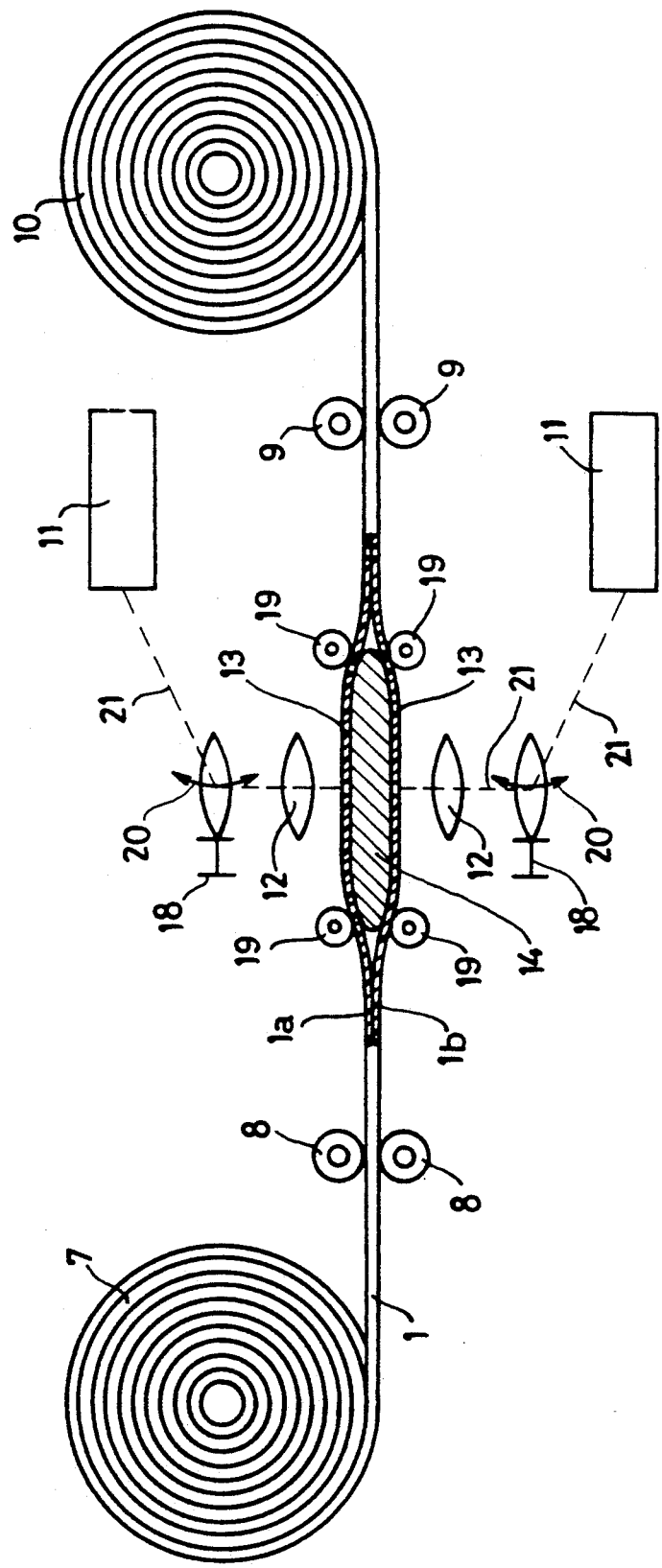
FIG. 2 shows an installation for carrying out the process according to the invention with a support to be placed inside a tubular foil.

FIG. 2 shows an installation for carrying out the process according to the invention. This installation comprises a stock reel 7 for tubular plastic foil 1, tubular foil conveying means in the form of feed rollers 8 for conveying a tubular foil, tubular plastic foil discharge means in the form of discharge rollers 9, and a storage reel 10 for storing perforated tubular plastic foil 1. The tubular foil can be conveyed continuously by means of the feed rollers 8 and discharge rollers 9.

The installation is also provided with a laser beam source 11 and a number of lenses 12 placed next to each other, and each set to make the laser beam act on a perforation forming plane 13, 13' where a tubular foil wall 1a, 1b is being conveyed tautly. The perforation forming plane 13 and 13' is formed by a support 14 placed in the tubular foil 1, with tubular foil wall 1a, 1b being conveyed tautly over this support 14. The support 14 is held fixed by supporting rollers 19.

The above-mentioned perforations 2 are obtained by fitting a number of lenses 12 arranged across the width of the tubular foil, and making the laser beam act upon the adjacent lenses 12. Through working with several lenses 12 and a moving lens beam-directing means, it is possible to make do with one laser beam source 11.

Since the intermittent laser beam, which alternately directs a beam on one lens 12 at a time by means of lens beam-directing means 18, is always focused here by the lens 12 in question on the perforation forming plane 13, 13', perforations of the desired size of 50 to 250 $\mu m$ are obtained in the correct place.

It is expedient to work with mirrors 18, in particular with beam-directing means designed with one or more rotatable mirrors 18 in order to be able to direct the laser beam towards one lens 12 of a number of adjacent lenses, and subsequently on the perforation forming planes 13, 13' which always lie at the focal point of the lenses 12. The rotation facilities of the mirrors 18 are shown schematically by the curve 20. A laser beam emitted by the laser beam source 11 is directed by rotating mirror 18 onto one of the lenses 12 and then by this lens 12 onto the perforation forming plane 13 or 13', where the tubular foil is conveyed tautly. The path of a laser beam is indicated by dashed line 21.

Although two laser beam sources 11 are shown in the figure, it is also possible to work with one source 11.

The pattern of the perforations shown in FIG. 1 is obtained by focusing one laser beam onto a continuously conveyed tubular foil above which a set of lenses 12 is set up at regular intervals from each other over the width of the foil web. The laser source works intermittently in such a way that the laser beam acts successively on a next lens 12 in the transverse direction. In view of the conveyance of the tubular foil in the period of time in which the laser beam acts on the first lens and subsequently on the lens following in the transverse direction of the foil, the perforation 2" formed by a following lens 12 will lie lower, as seen in the lengthwise direction, than the perforation 2'. In the finished foil the perforations 2' to 2""" consequently lie on an imaginary line B which runs at an angle relative to the longitudinal axis of the tubular foil.

The perforations are preferably made slightly tapered, with a minimum aperture at the inside of the tubular foil.

It is claimed:

1. Process of manufacturing a perforated tubular plastic foil having an inside surface and an outside surface defining an interior through the action of a laser beam on a tubular foil wall, comprising the steps of:

forming perforations ranging from 50 to 250 $\mu m$ in size, wherein during the perforation action a part of the wall to be perforated is guided in a perforation forming plane on which the laser beam is focused, said part to be perforated lying free from a remaining rest of the wall of the tubular foil; and conveying the wall part to be perforated tautly over an elongate support having front and rear ends placed within the interior of the tubular foil; holding said support in place by a plurality of rollers disposed on the outside surface of the tubular foil and located so as to cooperate with the ends of said support.

2. Process according to claim 1, wherein the perforations are made slightly tapering with a minimum aperture on the inside surface of the tubular foil.

3. Process according to claim 1, wherein during the perforation action two opposite wall parts of the tubular foil are each perforated in a separate perforation working plane.

4. Process according to claim 1, wherein the tubular foil is conveyed continuously.

5. Process according to claim 1, wherein the tubular foil is moved continuously in a direction of conveyance and wherein further an intermittent laser beam moves at right angles to the direction of conveyance along the continuously moving tubular foil, thereby forming a pattern of perforations placed in parallel lines.

6. A process of manufacturing a perforated tubular plastic foil having an inside surface and an outside surface defining an interior through the action of a laser beam on a tubular foil wall, comprising the steps of:

forming perforations ranging from 50 to 250 μm in size, said perforations made slightly tapering with a minimum aperture on the inside surface of the tubular foil, wherein during the perforation action a part of the wall to be perforated is guided in a perforation forming plane on which the laser beam is focused, said part to be perforated lying free from a remaining rest of the wall of the tubular foil; and continuously conveying the wall part to be perforated tautly over a support placed in the interior of the tubular foil, wherein the tubular foil is moved continuously in a direction of conveyance and wherein further an intermittent laser beam moves at right angles to the direction of conveyance along the continuously moving tubular foil, thereby forming a pattern of perforations placed in parallel lines.

7. Process of manufacturing a perforated tubular plastic foil having an inside surface and an outside surface defining an interior through the action of a laser beam on a tubular foil wall, comprising the steps of:

forming a pattern of perforations placed in parallel lines and slightly tapered with a minimum aperture on the inside surface of the tubular foil and ranging from 50 to 250 μm in size by moving an intermittent laser beam at right angles to a direction of conveyance, wherein during the perforation action two opposite wall parts to be perforated are guided such that said opposite wall parts are each perforated in a separate perforation forming plane on which the laser beam is focused, said part to be perforated lying free from a remaining rest of the wall of the tubular foil; and conveying continuously in the direction of conveyance the wall part to be perforated tautly over an elongate support having front and rear ends placed within and held in place in the interior of the tubular foil.

8. Apparatus for perforating tubular foil, comprising a device forming a laser beam, tubular plastic foil supply means, tubular plastic foil conveying means for conveying the tubular foil and adapted for continuous conveyance, tubular plastic foil discharge means, laser beam action interruption means, tubular plastic foil support means, said support means comprising an elongate supporting member having a front end and a rear end cooperating with a plurality of support rollers located at each end thereof, said support means guiding a wall part of a plastic tubular foil to be perforated in a perforation forming plane, while that part of the tubular plastic foil not being perforated lies free from this perforation forming plane, and beam-directing means and at least one lens for focusing the laser beam on said perforation forming plane, the supporting member adapted to be placed inside said tubular foil, and over which the tubular foil can be guided tautly, with said support rollers disposed outside of said tubular foil.

9. Installation according to claim 8, further including one or more rotating mirrors for directing a laser beam onto the lenses.

* * * * *